United States Patent [19]
Falcou et al.

[11] Patent Number: 5,050,449
[45] Date of Patent: Sep. 24, 1991

[54] DEVICE FOR ACTUATING IN ROTATION A MECHANISM AND CONTROL STICK INCORPORATING SAID DEVICE

[75] Inventors: Gérard Falcou, Sollies-Toucas; Christian M. J. Vigne, Carqueiranne; Henri Serindat, Toulon; Claude J. G. Sorin, Saint Tropez, all of France

[73] Assignee: Societe ECA, Asnieres, France

[21] Appl. No.: 489,359

[22] Filed: Mar. 6, 1990

[30] Foreign Application Priority Data

Mar. 17, 1989 [FR] France ............................ 89 03502

[51] Int. Cl.[5] ........................................ F16H 27/02

[52] U.S. Cl. ............................ 74/625; 74/89.14; 74/471 XY; 338/128

[58] Field of Search .............. 74/89.14, 471 XY, 625; 338/128

[56] References Cited

U.S. PATENT DOCUMENTS

| | | | |
|---|---|---|---|
| 3,026,744 | 3/1962 | Rouse | 74/625 |
| 3,208,299 | 9/1965 | Leonard et al. | 74/471 XY |
| 3,308,675 | 3/1967 | Jonsson | 338/128 X |
| 3,409,252 | 11/1968 | Miller | 338/128 X |
| 4,422,345 | 12/1983 | Green | 74/471 XY |

*Primary Examiner*—Allan D. Herrmann
*Assistant Examiner*—David W. Laub
*Attorney, Agent, or Firm*—Martin Smolowitz

[57] ABSTRACT

A device for actuating in rotation a mechanism and control stick incorporating the device, which includes, elastic means for applying to a control shaft (10) a reaction torque having a magnitude which is a function of the angle of rotation of the shaft comprise a cam follower structure (18, 24) which is slidably mounted on a reaction lever (22) having an axis Z—Z perpendicular to the control shaft (10) and which is elastically slidably biased so as to cooperate with a confronting cam profile (16) formed on a reaction member (42) relative to which the cam follower structure (24, 18) is moved when the control shaft (10) is rotated, the cam profile (16) extending in a plane perpendicular to the control shaft (10).

14 Claims, 4 Drawing Sheets

FIG_1
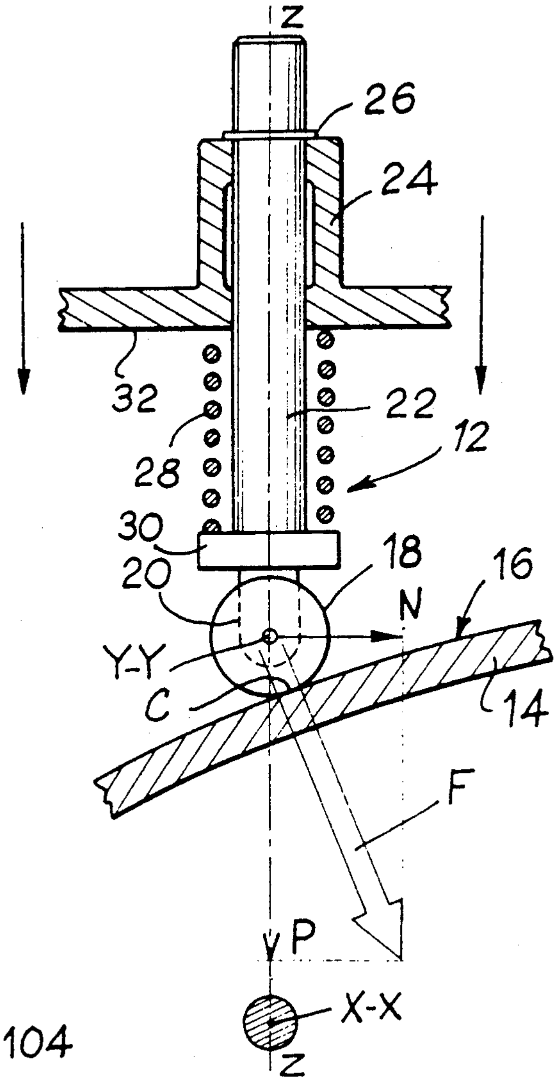
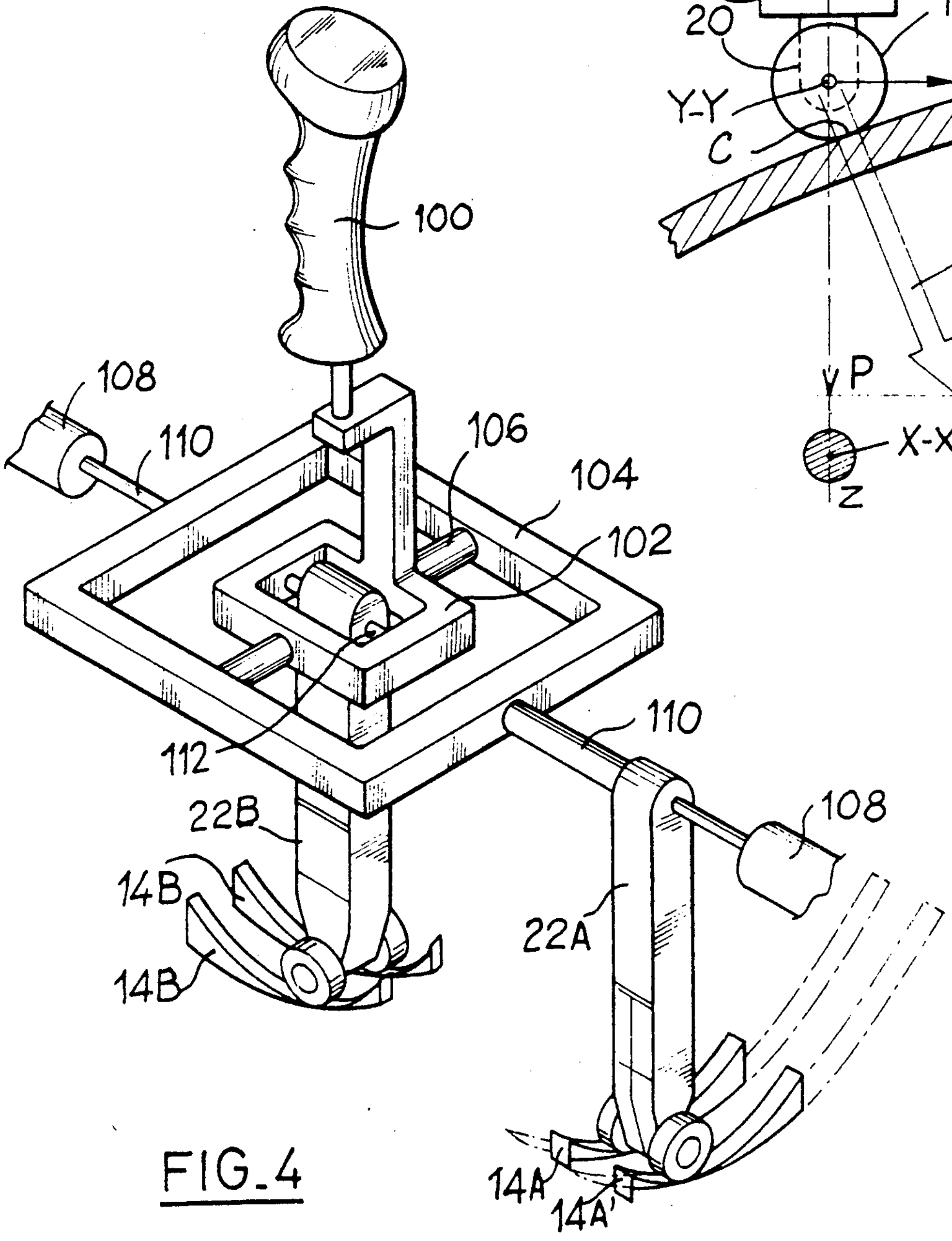
FIG_4

DEVICE FOR ACTUATING IN ROTATION A MECHANISM AND CONTROL STICK INCORPORATING SAID DEVICE

BACKGROUND OF THE INVENTION

The present invention relates to a device for actuating in rotation a mechanism by means of a control shaft mounted to rotate about its axis in a support, and which comprises elastic means for applying to the control shaft a reaction torque the magnitude of which is a function of the angle of rotation of the shaft.

Devices of this type are known in which a reaction torque is applied to the shaft, for example by causing it to raise a weight or stress a spring in the course of its rotation. It is in particular known to mount on the shaft a spring which is coiled around the axis of the shaft, fixed on one hand to the shaft itself and on the other hand to the support. With this arrangement, a reaction torque is obtained which is substantially proportional and of opposite sign to the angle of rotation of the shaft relative to the support. The sole solution known for modifying the law of variation of the reaction torque as a function of the angle of rotation consists in modifying the ratio of proportionality by changing the spring.

SUMMARY OF THE INVENTION

In order to overcome this drawback and to provide a device in which the magnitude of the reaction torque is a function of the angle of rotation and which is more complicated than the simple proportionality, the invention provides a device of the aforementioned type, wherein the elastic means comprise a cam follower structure which is slidably mounted on a reaction lever having an axis perpendicular to the control shaft, and is elastically and slidably biased so as to cooperate with a cam profile in confronting relation formed on a reaction member with respect to which the cam follower structure moves when the control shaft rotates, the cam profile extending in a plane perpendicular to the control shaft.

According to other features of the invention:

the cam follower structure comprise a sleeve slidably mounted on the reaction lever, a compression coil spring having one end bearing against a facing radial face of the sleeve and having the opposite end bearing against a radial abutment shoulder on the reaction lever, and at least one cam follower roller mounted on the sleeve to be pivotable about an axis parallel to the axis of the control shaft;

the reaction lever is connected to rotate with the control shaft and the reaction member is immobilized relative to the support.

According to a further feature of the invention, the reaction member is in the form of a sector mounted in the support to pivot about an axis coincident with the axis of the control shaft, and means are provided for preventing the sector from rotating about its axis and for driving the sector by pivoting it about its axis so as to modify the angular setting of the cam profile relative to the cam follower structure and therefore the law of variation of the reaction torque.

According to other features of the invention:

the means for immobilizing and driving the sector comprise a portion of a circular ring gear formed on the sector and a driving and immobilizing gear pinion which cooperates with the portion of the ring gear;

the means for immobilizing and driving the sector are releasable means for temporarily interrupting the displacement of the cam follower structure relative to the cam profile;

the pinion is connected to a frame which is mounted to be movable relative to the support in a direction perpendicular to the axis of the control shaft.

By means of these features the law of variation of the reaction torque as a function of the angle of rotation may be angularly staggered without dismantling or changing the cam profile, but by merely turning the sector about its axis. The term "law of variation" will be understood to mean that the value of the reaction torque generated by the elastic means has a value which is a function of the angle of rotation of the shaft about its axis, and that a variation in the reaction torque depends upon the angular position of the shaft. It is also possible to release the control shaft from any reaction torque by releasing the sector driving and immobilizing means.

The invention also provides a device which comprises two cam follower rollers which are mounted on the sleeve to pivot about a common axis, each of which rollers cooperates with a distinct confronting cam profile, it being possible to include in the device two reaction members arranged symmetrically on each side of the axis of the reaction lever and sleeve and on each of which one of the two cam profiles is formed.

The invention also relates to a piloting stick for a vehicle having electrical controls and in particular for an aircraft or a submarine vehicle, said stick being so arranged that it is connected to rotate with at least a first control shaft of a first device for actuating in rotation according to the invention, and comprising sensors measuring the relative displacements of the cam follower structure relative to the cam profile, and means for converting the measured values into electrical control signals.

According to other features of the stick:

the sensors comprise sensors of the relative angle of rotation between the cam follower structure and the cam profile, and sensors of the angle of pivoting of the reaction sector relative to the support;

the stick is connected to rotate with a second control shaft of a second actuating device according to the invention, the axes of the first and second control shafts being perpendicular and concurrent;

the support of the second actuating device is a frame connected to rotate with the first control shaft and in which the second control shaft is rotatively mounted, and the reaction lever of the second actuating device is pivotally mounted in another frame connected to rotate with the second control shaft about an axis perpendicular to and concurrent with the axis of rotation of the second control shaft.

DESCRIPTION OF THE DRAWINGS

The following description with reference to the accompanying drawings given as non-limitative examples, will explain how the invention may be carried out.

FIG. 1 is a diagrammatic view of a first simplified embodiment of an actuating device according to the invention which will show the principle of the operation.

FIG. 4 is a diagrammatic perspective view illustrating the principle of the pivotal mounting of a piloting stick for a vehicle having electrical controls about two perpendicular pivot axes.

DESCRIPTION OF THE PREFERRED EMBODIMENTS

Figure 2:
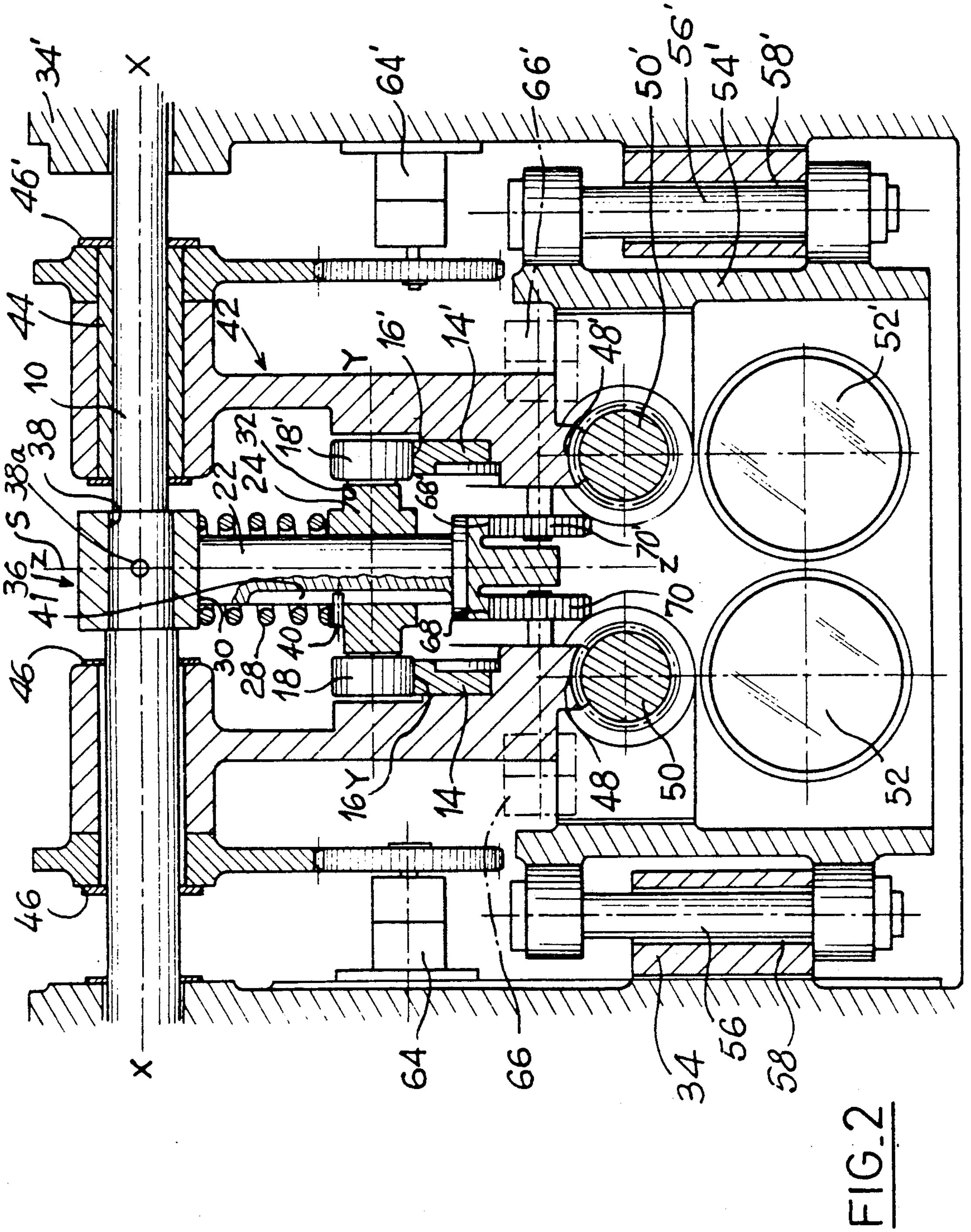
FIG. 2 is an axial sectional view taken on line 2—2 of FIG. 3 of a preferred embodiment of an actuating device according to the invention.

FIG. 1 diagrammatically represents a control shaft 10 of a device for actuating in rotation a mechanism (not shown) to which a reaction torque is desired to be applied through means 12.

The control shaft 10 is rotatively mounted in a support (not shown) on which is also fixed a cam member 14 whose surface 16, having a convexity facing toward the axis X—X of the shaft 10, constitutes a cam track or profile for a cam follower roller 18.

The roller 18 is mounted to rotate about an axis Y—Y on the lower end 20 of a reaction lever 22 which is connected to rotate with the control shaft 10 by means not shown.

The reaction lever 22 is cylindrical and receives a sleeve 24 slidably mounted thereon. The sleeve 24 is retained axially in the upward direction by a ring 26 mounted in a groove in the cylindrical lever 22.

A compression coil spring 28 bears, on one hand, against a lower radial abutment shoulder 30 on the lever 22 and, on the other hand, bears against a confronting face 32 of the sleeve 24 so as to elastically bias the cam follower roller 18 against the cam track 16.

The device 12 creates a reaction force F which passes through the point of contact C between the roller 18 and the cam track 16 and is perpendicular to the surface of the latter.

The component P of the force F parallel to the axis of the reaction lever 22 is balanced on the latter by the force of compression of the spring 28 and its normal component N, which is perpendicular to the axis of the lever 22 and is balanced on the cam 14 by the reaction torque applied to the control shaft 10.

An actuating device is in this way provided in which the magnitude of the reaction torque applied to the control shaft 10 is a function of the profile of the cam track 16, and is therefore no longer merely proportional to the angle of rotation of the shaft 10.

As a variant (not shown) the reaction lever 22 may be fixed in rotation in the support 24 and the cam 14 connected to rotate with the control shaft 10.

There will now be described the preferred embodiment of an actuating device according to the invention with reference to FIGS. 2 and 3.

The device is a double device which is symmetrical relative to the median plane S of FIG. 2 perpendicular to the plane of the Figure and to the axis X—X of the control shaft 10. The elements of the left half of the device of FIG. 2 will be designated by the same reference numerals as those of the right half with the addition of the index "'".

The control shaft 10 is mounted to rotate about its axis X—X in a support 34, 34'.

There will be recognized the reaction lever 22 which is mounted on the control shaft 10 by its upper end portion 36 in a bore 38 in which is received the control shaft 10, with which the lever 22 is connected to rotate and is immobilized axially by means of a pin **38*a***.

The sleeve 24 is slidably mounted on the reaction lever 22 and is immobilized in rotation about the axis Z—Z of the latter by means of a lug 40 received in an axial groove 41.

The coil spring 28 elastically biases the sleeve 24 vertically downwardly, the sleeve carrying on each side and symmetrically relative to the axis Z—Z two cam follower rollers 18 and 18' which are mounted to freely rotate about a common axis Y—Y parallel to the axis X—X of the control shaft 10.

The control shaft 10 carries on each side of the reaction lever 22 a reaction member in the form of a sector 42, 42' which is freely rotatively mounted on the shaft 10 by means of a bush 44, 44'.

The two reaction sectors 42 and 42' are axially immobilized on the shaft 10 by stop rings 46 and 46'.

Each reaction sector 42, 42' includes in its median part a cam track or profile 16, 16' formed in a cam member 14, 14' which is mounted on the reaction sector 42, 42' and cooperates with the confronting cam follower roller 18, 18'.

The arrangement of the cam member 14, 14' mounted on the reaction sector 42, 42' permits modifying the profile of the cam track 16, 16' and therefore the law of variation of the reaction torque applied to the control shaft 10.

Each reaction sector 42, 42' includes at its lower end a portion of a ring gear 48, 48' which is circular and centered on the axis X—X of the control shaft 10. The teeth of the gear portion 48 are meshed with a tangent worm having a helical thread 50 which, in the embodiment shown in FIGS. 2 and 3, has an axis perpendicular to the axis X—X of the shaft and constitutes the equivalent of a pinion for immobilizing and/or driving the reaction sector 42, 42' about the axis X—X.

The worm 50, 50' having the helical thread is adapted to be driven in rotation by an electric motor 52, 52'. The worm 50, 50' and its motor 52, 52' are mounted to be associated as a pair on a frame 54, 54'. The frame 54, 54' is mounted to be slidable relative to the support by means of a pair of guide pillars 56, 56' which are received in bores 58, 58' in the support 34, 34' and are perpendicular to the axis X—X.

The upward or downward sliding of the frame 54 under the effect of its weight can be controlled by a pair of cams 60 which are driven in rotation and cooperate with the lower ends 62, 62' of the guide pillars 56, 56'.

The cams 60, 60' are adapted to be driven in rotation manually by a lever or by an electric motor (not shown).

As shown in the Figures, the frames 54 and 54' are in the upper positions and the worms 50, 50' cooperate with the teeth 48, 48' in such manner as to immobilize in rotation the reaction sectors 42, 42'.

In this position, bearing in mind the profile of the cam tracks, when the shaft 10 is rotated away from its mean position shown in the Figures, the rollers 18, 18' are acted upon by the cams 14, 14' and the sleeve 24 progressively rises along the reaction lever 22 in opposition to the compression force which is exerted by the spring 28 and increases with increase in the angle of rotation. There is therefore created by means of the reaction lever 22 a reaction torque applied to the shaft 10 which follows the desired law as a function of the angle and corresponding to the profile of the cam tracks 16, 16'.

The profile of the cam tracks 16, 16' may be different so that the movement of the sleeve 24 is produced by that one of the two rollers which is axially displaced to the greatest extent by its cam track toward the axis X—X in a direction parallel to the direction Z—Z.

Figure 3:
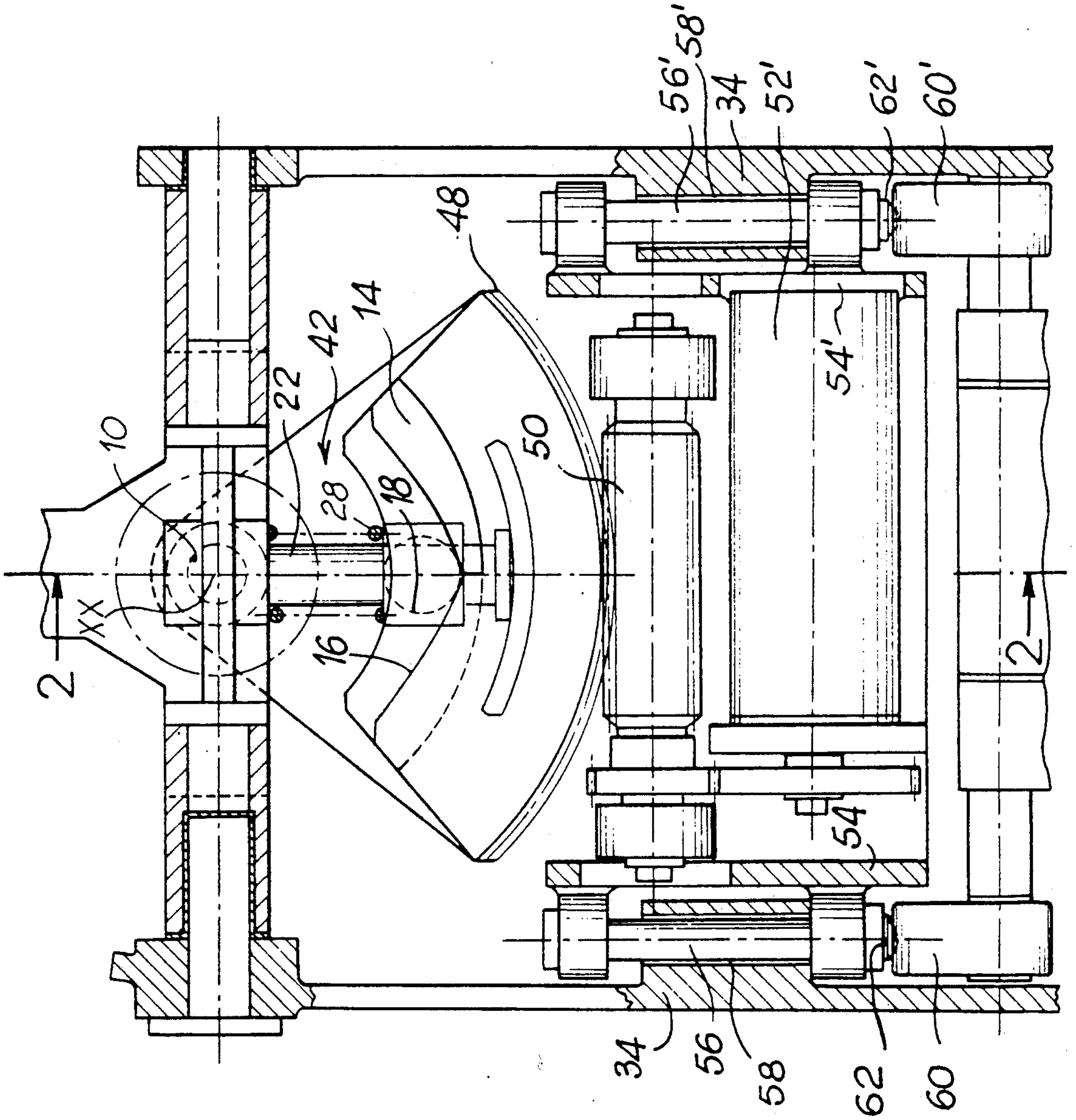
FIG. 3 is a partial sectional view in a plane perpendicular to the axis of rotation of the control shaft of the device of FIG. 2.

It will easily be understood that, if the reaction members 42 and 42' are independently or simultaneously pivoted about the axis X—X by the worms 50, 50', the law of variation of the reaction torque applied to the control shaft 10 is modified, i.e. this law of variation is angularly staggered relative to the position shown in FIGS. 2 and 3.

If the frame 54, 54' is slid downwardly, the worms 50, 50' are released from the teeth 48, 48' and the reaction sectors 42, 42' are then no longer immobilized in rotation about the axis X—X. Consequently, a reaction torque is no longer applied to the control shaft 10, the rollers 18, 18' simultaneously driving in rotation the reaction sectors 42, 42' about the axis X—X.

Note that, if no torque is applied externally to the control shaft 10 for actuating a mechanism, the driving in rotation of the toothed reaction sectors 42, 42' by the motors 52, 52' results in an equal rotation of the reaction lever 22 and therefore of the control shaft 10.

According to the invention, it can be seen in FIG. 2 that the device comprises sensors of angles of rotation which permit employing such an actuating device with a variable reaction torque for incorporating it in a piloting stick of an aircraft or submarine vehicle having electric controls.

These angle sensors may be of various known types such as in particular electric potentiometers or numerical optical sensors. They are doubled for reasons of security. The sensors 64 and 64' are driven by the rotation of the reaction sectors 42 and 42' through gears and they have for function to measure the angles of the driving of the cams 14 and 14' by the motors 52 and 52'. Sensors 66 and 66' are carried by each of the reaction sectors 42 and 42' and are driven through teeth 68 and 68' on the reaction lever 22 and gear wheels 70 and 70' pivotally mounted on the reaction sectors 42 and 42' for the purpose of measuring the relative angle of rotation between the reaction lever 22 and the cams 14 and 14', i.e. the angle which produces the reaction torque.

The absolute angle of rotation of a control stick, connected to rotate with the control shaft 10, relative to the support 34, 34' is equal to the sum of the relative driving angles measured by the sensors 64 and 64' on one hand and sensors 66 and 66' on the other. This summing may be carried out in an electronic computer (not shown) which gives the value of the electric control to which the vehicle equipped with such a control stick is subjected.

Furthermore, by means of these angle measurements, it is possible to install in the piloting station of the aircraft or submarine vehicle, a second stick which may operate as a "slave" when the first stick is a "master" and inversely. To this end, it is sufficient to control the motors 52 and 52' of the slave stick in such manner that they re-apply the same values to the driving angle sensors 64, 64' as those coming from the master stick.

FIG. 4 shows the principle of the pivotal mounting of a control stick having two perpendicular and concurrent axes. A stick 100 is connected to an inner frame 102 which is mounted in an outer frame 104 to pivot about a transverse shaft 106 connected to the stick 100 and to the outer frame 104.

The outer frame 104 is rotatively mounted in a support 108 connected to the structure of the vehicle to be piloted by means of the stick 100. The outer frame 104 is pivotally mounted by means of a longitudinal pivot shaft 110 connected to the outer frame 104 and to the support 108. The transverse shaft 106 and the longitudinal shaft 110 are perpendicular and concurrent.

The rotative shaft 110 connected to the outer frame 104 on the longitudinal axis supports a first reaction lever 22A whose rollers cooperate with two cams 14A and 14A' according to an arrangement of the actuating device having a reaction torque of the type described hereinbefore and corresponding to a lateral movement of the stick. The angle sensors connected to this first device permit pursuing the transverse tilting angle of the stick, i.e. more precisely that defined by the axis of the stick and the longitudinal axis.

Mounted within the inner frame 102 is a second reaction lever 22B mounted to pivot about a longitudinal shaft 112 of the inner frame 102, which is perpendicular to and concurrent with the transverse shaft 106 and is parallel and geometrically coincident with the longitudinal shaft 110 when the stick 100 is in the zero position.

The second reaction lever 22B cooperates with a second double cam 14B, 14B' in a second actuating device having a reaction torque of the type described hereinbefore and corresponding to a longitudinal movement of the stick. The sensors of the angle of rotation of this second device represent an angle substantially equal to the angle of the longitudinal tilting of the stick in the outer frame 104. The arrangement of the inner frame 102 around the second reaction lever 22B permits arranging that the double cam 14B, 14B' is connected to the support 108 whereas, if it were connected to the outer frame 104 it would occupy a much larger volume in its lateral tilting movement.

Figure 5:
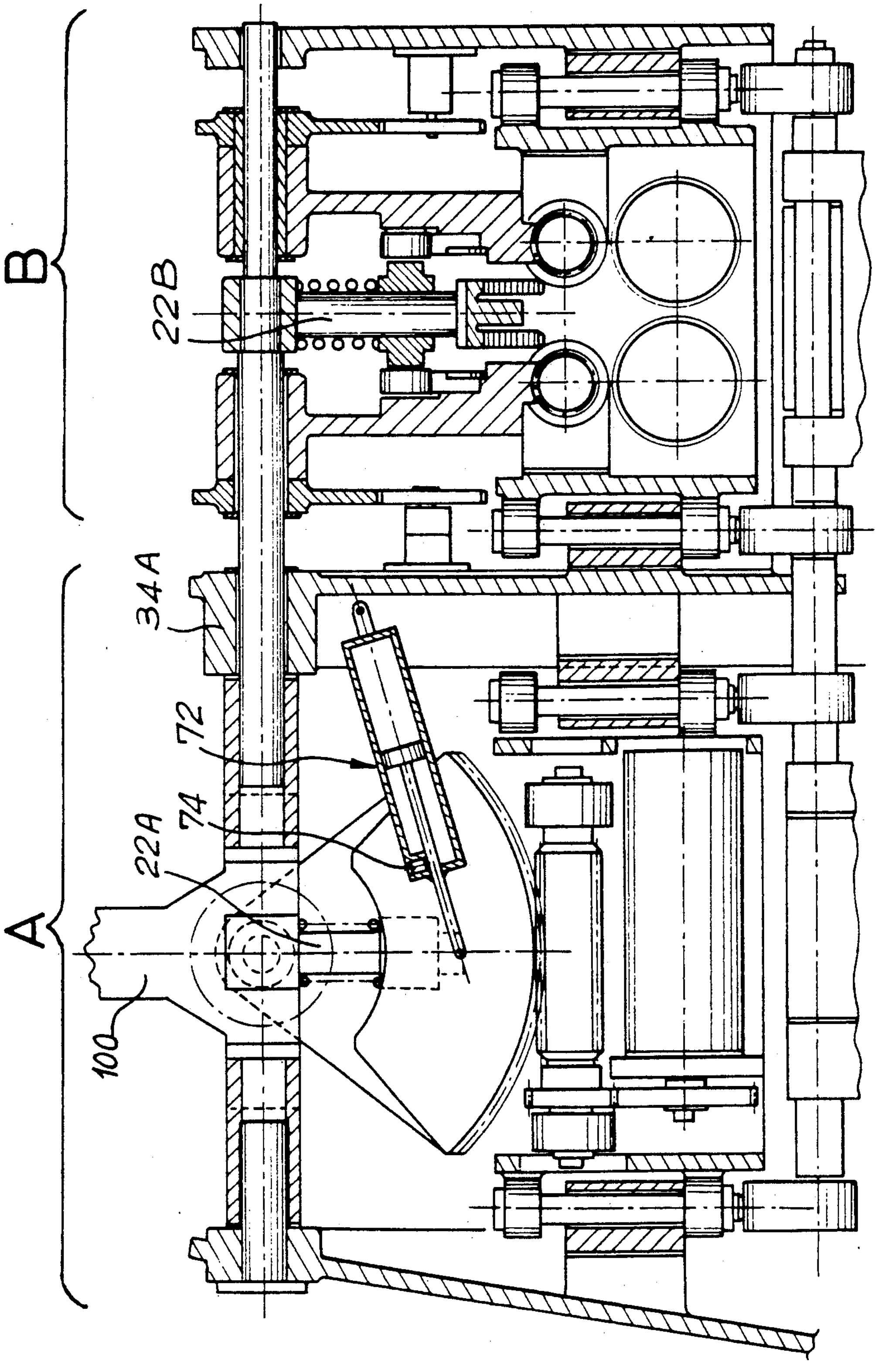
FIG. 5 is a partial sectional view of the arrangement of two actuating devices of the type shown in FIGS. 2 and 3 and of their mutual cooperation for the construction of the pivotal mounting of the control stick diagrammatically represented in FIG. 4.

FIG. 5 shows a piloting stick system having two perpendicular and concurrent axes in respect of which the pivotal mounting principle was described with reference to FIG. 4 and the details of the construction of each of the two actuating devices were described with reference to FIGS. 2 and 3.

Also shown in FIG. 5 is a viscous brake 72 which is constituted by the cylinder and the piston of a cylinder device, one being coupled to the support 34A and the other being coupled to the reaction lever 22A and applying to the latter, and therefore to the stick 100, a damping effect which is substantially proportional and opposed to the speed of longitudinal tilting of the stick. This effect is adjustable by means of a pointed set screw 74. An identical device may be mounted (but is not shown in FIG. 5) on the reaction lever 22B in respect of the lateral tilting movement.

What is claimed is:

1. Device for actuating in rotation a mechanism, said device comprising a support, a control shaft having an axis of rotation and mounted to be rotatable about said axis on said support, elastic means for applying to the control shaft a reaction torque having a magnitude which is a function of the angle of rotation of the shaft about said axis, said elastic means comprising a reaction lever having an axis perpendicular to the axis of the control shaft, a cam follower structure which is axially slidably mounted on the reaction lever, a reaction member, a cam profile provided in confronting relation to the cam follower structure on the reaction member, means for elastically biasing the cam follower structure in such manner that the cam follower structure is slidable along the reaction lever and cooperative with the cam profile, the cam follower structure being movable relative to the reaction member when the control shaft is rotated about the axis of rotation of the control shaft and the cam profile extending in a plane perpendicular to the control shaft.

2. Device according to claim 1, wherein the cam follower structure comprises a sleeve slidably mounted on the reaction lever, a radial face on the sleeve, a radial abutment shoulder on the reaction lever, a compression coil spring having one end bearing against the radial face on the sleeve and an opposite end bearing against the radial abutment shoulder on the reaction lever, and at least one cam follower roller mounted on the sleeve to pivot about an axis parallel to the axis of rotation of the control shaft.

3. Device according to claim 1, wherein the reaction lever is connected to rotate with the control shaft and the reaction member is immobilized relative to the support.

4. Device according to claim 3, wherein the reaction member is in the form of a sector mounted on the support to pivot about an axis coincident with the axis of rotation of the control shaft, and means are provided for immobilizing in rotation and for driving the sector about the axis coincident with the axis of rotation of the control shaft so as to modify the angular setting of the cam profile relative to the cam follower structure and thereby modify the law of variation of the reaction torque.

5. Device according to claim 4, wherein the means for immobilizing and driving the sector comprise a portion of a circular ring gear provided on the sector and a driving and immobilizing gear pinion cooperative with the portion of the ring gear.

6. Device according to claim 4, wherein the means for and driving the sector comprise releasable means for temporarily interrupting the relative displacement between the cam follower structure and the cam profile.

7. Device according to claim 6, wherein the means for immobilizing and driving the sector comprise a portion of a circular ring gear provided on the sector and a driving and immobilizing gear pinion cooperative with the portion of the ring gear, said device further comprising a frame which is mounted to be movable relative to the support in a direction perpendicular to the axis of rotation of the control shaft, said pinion being connected to said frame.

8. Device according to claim 3, wherein the cam follower structure comprises a sleeve axially slidably mounted on the reaction lever, a radial face on the sleeve, a radial abutment shoulder on the reaction lever, a compression coil spring having one end bearing against the radial face on the sleeve and an opposite end bearing against the radial abutment shoulder on the reaction lever, two cam follower rollers mounted on the sleeve to be pivotable about a common axis parallel to the axis of rotation of the control shaft, an additional reaction member and an additional cam profile on the additional reaction member being provided, each cam follower roller being in confronting relation to and cooperative with a respective cam profile.

9. Device according to claim 8, wherein the cam follower structure comprises a sleeve axially slidably mounted on the reaction lever, a radial face on the sleeve, a radial abutment shoulder on the reaction lever, a compression coil spring having one end bearing against the radial face on the sleeve and an opposite end bearing against the radial abutment shoulder on the reaction lever, and at least one cam follower roller mounted on the sleeve to pivot about an axis parallel to the axis of rotation of the control shaft, the reaction member being in the form of a sector mounted on the support to be pivotable about an axis coincident with the axis of rotation of the control shaft, and means being provided for immobilizing in rotation the sector about the axis coincident with the axis of rotation of the control shaft so as to modify the angular setting of the cam profile relative to the cam follower structure and therefore the law of variation of the reaction torque, said device further comprising an additional reaction member and an additional cam profile provided on the additional reaction member, the two reaction members being arranged symmetrically on each side of the axis of the reaction lever.

10. Piloting stick for a vehicle having electric controls, in combination with a device for actuating in rotation a mechanism, said device comprising a support, a control shaft having an axis of rotation and mounted to be rotatable about said axis on said support, elastic means for applying to the control shaft a reaction torque having a magnitude which is a function of the angle of rotation of the shaft about said axis, said elastic means comprising a reaction lever having an axis perpendicular to the axis of rotation of the control shaft, a cam follower structure which is axially slidably mounted on the reaction lever, a reaction member, a cam profile provided in confronting relation to the cam follower structure on the reaction member, means for elastically biasing the cam follower structure in such manner that the cam follower structure is slidable along the reaction lever and cooperative with the cam profile, the cam follower structure being movable relative to the reaction member when the control shaft is rotated about the axis of rotation of the control shaft, the cam profile extending in a plane perpendicular to the control shaft, the reaction lever being connected to rotate with the control shaft, the reaction member being in the form of a sector mounted relative to the support to be pivotable about an axis coincident with the axis of rotation of the control shaft, and means being provided for immobilizing in rotation and driving the sector about the axis coincident with the axis of rotation of the control shaft so as to modify the angular setting of the cam profile relative to the cam follower structure and therefore modify the law of variation of the reaction torque, said piloting stick comprising sensors for measuring the relative movement between the cam follower structure and the cam profile, a means for converting the measured movement values into electrical control signals.

11. Piloting stick according to claim 10, wherein the sensors comprise sensors for measuring the relative angle of rotation between the cam follower structure and the cam profile, and sensors for measuring the angle of the pivoting of the sector relative to the support.

12. Piloting stick according to claim 10, further comprising a second device identical to the first-mentioned device for actuating in rotation a mechanism, said second device comprising a support, a control shaft having an axis of rotation and mounted to be rotatable about said axis on said support, elastic means for applying to the control shaft a reaction torque having a magnitude which is a function of the angle of rotation of the shaft about said axis, said elastic means comprising a reaction lever having an axis perpendicular to the axis of the control shaft, a cam follower structure which is slidably mounted on the reaction lever, a reaction member, a cam profile provided in confronting relation to the cam follower structure on the reaction member, means for elastically biasing the cam follower structure in such manner that the cam follower structure is slidable along the reaction lever and cooperative with the cam profile, the cam follower structure being movable relative to the reaction member when the control shaft is rotated about the axis of rotation of the control shaft, the cam profile extending in a plane perpendicular to the control shaft, the reaction lever being connected to rotate with the control shaft and the reaction member being immobilized relative to the support, the reaction member being in the form of a sector mounted on the support to pivot about an axis coincident with the axis of rotation of the control shaft, and means being provided for immobilizing in rotation the sector about the axis coincident with the axis of rotation of the control shaft so as to modify the angular setting of the cam profile relative to the cam follower structure, and therefore the law of variation of the reaction torque, said piloting stick being connected to rotate with the control shaft of said second device, the axis of rotation of the control shaft of said first device and the axis of rotation of the control shaft of said second device being perpendicular and concurrent.

13. Piloting stick according to claim 12, wherein the support of said second device is a frame which is connected to rotate with the control shaft of said first device, the control shaft of said second device being rotatively mounted in said frame.

14. Piloting stick according to claim 13, wherein the reaction lever of said second device is pivotally mounted in a second frame connected to rotate with the control shaft of said second device about an axis perpendicular to and concurrent with the axis of rotation of the control shaft of said second device.

* * * * *